United States Patent Office 2,981,677
Patented Apr. 25, 1961

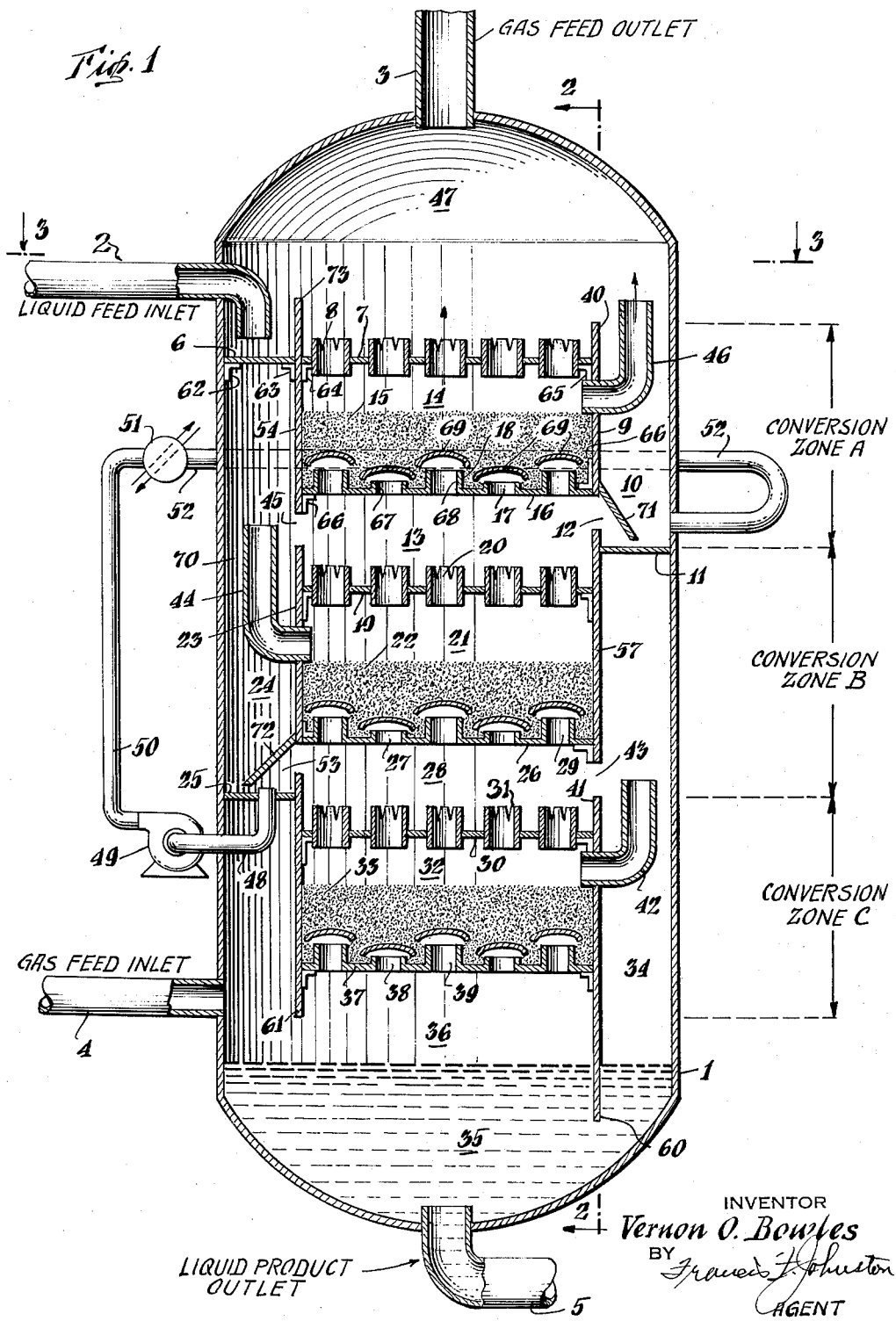

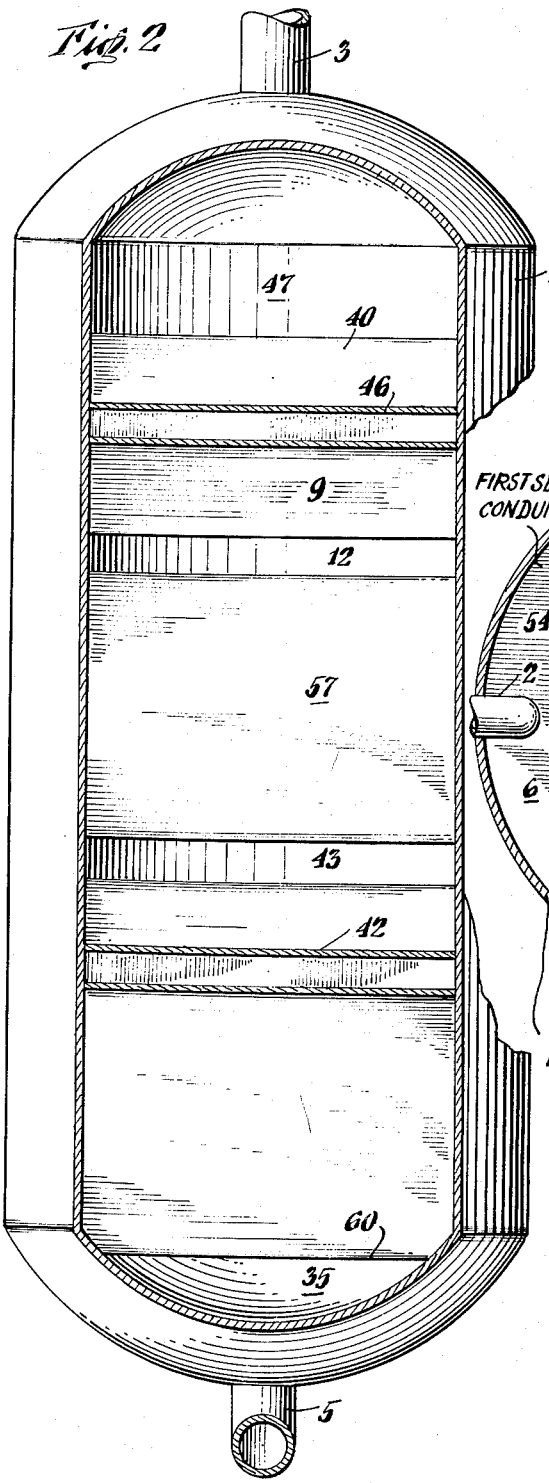
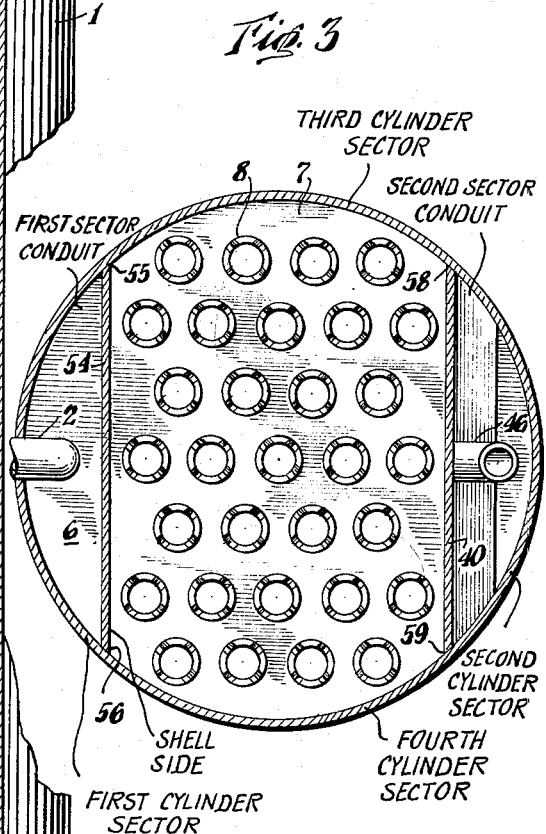

2,981,677

CONVERSION OF LIQUID HYDROCARBON IN THE PRESENCE OF A GASEOUS REACTANT AND PARTICLE-FORM SOLID CATALYTIC MATERIAL

Vernon O. Bowles, Rye, N.Y., assignor to Socony Mobil Oil Company, Inc., a corporation of New York Filed May 28, 1957, Ser. No. 662,286

6 Claims. (Cl. 208—146)

The present invention relates to the conversion of predominantly liquid hydrocarbons in the presence of a gaseous reactant and particle-form solid catalytic material and, more particularly, to the hydrogenation of predominantly liquid hydrocarbons in the presence of hydrogen and particle-form catalytic material wherein the predominantly liquid hydrocarbon flows through a series of reaction zones countercurrent to a hydrogen-containing gas.

The terms "predominantly liquid hydrocarbon" and "liquid hydrocarbon" are used herein to designate a hydrocarbon or a mixture of hydrocarbons, or one or more hydrocarbons admixed with one or more non-hydrocarbons such as organic compounds containing sulfur and/or nitrogen of which a major portion is liquid at the temperature and pressure existing in the conversion or reaction zones.

The term "conversion" includes any reaction taking place in the presence of a gaseous reactant and a particle form solid catalytic material and includes hydrogenation, dehydrogenation, dehydrocyclization or aromatization and isomerization.

The term "hydrogenation" includes any reaction which takes place in the presence of hydrogen in which there is a consumption of hydrogen and includes hydrogenation of aromatics as well as hydrogenation of unsaturates; hydrodesulfurization and hydrodenitrogenation; hydrocracking, i.e., conversion of hydrocarbons having a boiling point above gas oil to hydrocarbons boiling below gas oil in the presence of hydrogen, and treatment of hydrocarbon mixtures with hydrogen-containing gas to reduce sediment and gum-forming tendencies, to lighten the color or to improve the sediment or color stability thereof.

The term "particle-form solid catalytic material" is used herein to designate any catalytic material per se or supported on a carrier which carrier can be inert or can catalyze a conversion and which catalytic material is in fragments, pellets, balls, etc. sufficiently large enough not to be carried by the vapors passing through the catalyst beds.

The present invention provides for: establishing a static bed of particle-form solid catalytic material in each of a plurality of reaction or conversion zones which are in liquid and vaporous or gaseous communication, establishing in each of said plurality of reaction or conversion zones a pool of liquid hydrocarbon above the bed of particle-form solid catalytic material in each of said plurality of reaction or conversion zones, introducing liquid hydrocarbon into the first of said plurality of reaction zones, introducing gaseous reactant, e.g., hydrogen-containing gas, into the last of said plurality of reaction or conversion zones below the bottom of the bed of particle-form solid catalytic material therein, passing said gaseous reactant successively into each zone, upwardly through the bed of catalytic material therein and withdrawing the gaseous reactant from each zone whilst controlling the flow of liquid hydrocarbon to be treated or processed into the first reaction zone to flow at least 75%, and preferably 100 percent, of said liquid hydrocarbon entering the pool through the bed of catalytic material in each zone and combining the catalytically contacted liquid hydrocarbon with liquid hydrocarbon which by-passed the bed of catalytic material (if any) to form a succeeding zone feed before introducing said succeeding zone feed into the succeeding reaction or conversion zone, providing when necessary or desirable means to control reaction temperature by heat exchanging a portion of the material by-passing a reaction or conversion zone and returning said heat exchanged material to the entrance of the by-passed zone or to a reaction or conversion zone upstream (with respect to the flow of liquid hydrocarbon) of said by-passed reaction or conversion zone or, in general, to any suitable point upstream with respect to the liquid flow, withdrawing gaseous reactant and hydrocarbon vapors from the first reaction or conversion zone, and withdrawing treated liquid hydrocarbon from the last reaction or conversion zone.

The present invention also provides an apparatus for conversion of liquid hydrocarbon in the presence of particle-form solid catalytic material and a gaseous reactant which is especially suitable for the practice of the present invention.

Those skilled in the art will understand fully the principles of the present invention from the following description taken in conjunction with the drawings, in which Figure 1 is a vertical section of a reactor particularly suitable for carrying out conversions of liquid hydrocarbons in the presence of particle-form solid catalytic material and gaseous reactant; Figure 2 is a vertical section of the aforesaid reactor taken on line 2—2; and Figure 3 is a horizontal section of the aforesaid reactor taken at line 3—3 of Figure 1.

In Figure 1 a cylindrical tank 1 having a top and a bottom is illustrated. Tank 1 is provided in the upper portion with an inlet 2 for predominantly liquid hydrocarbon to be treated (hereinafter designated liquid feed) and an outlet 3 for gaseous reactant and any hydrocarbon vapors or gases evolved during the conversion. In the lower portion of tank or reactor 1 is a gaseous-reactant inlet 4 and a treated-liquid-hydrocarbon or hydrocarbon product outlet 5.

Reactor 1 is insulated as necessary in a suitable manner (not shown). Internally reactor 1 is divided into a plurality of vertically superposed reaction or conversion zones "A," "B" and "C." Those skilled in the art will understand that reactor 1 can be divided into more or less conversion zones depending upon variables well known to those skilled in the art and that only three conversion zones are shown in Figure 1 for simplicity and clarity.

With catalyst in place reactor 1 is purged with an inert gas which is displaced with gaseous reactant. Gaseous reactant flows from a source not shown at a temperature and pressure suitable for the reaction through gaseous reactant inlet 4 through the reactor in a manner hereinafter described and finally to gaseous reactant outlet 3. When the inert gas in reactor 1 has been displaced with gaseous reactant at reaction temperature and pressure, liquid hydrocarbon, i.e., liquid feed is introduced at a temperature and pressure suitable for the reaction from a source not shown through liquid feed inlet 2.

The flow of liquid feed will first be described and the flow of gaseous reactant (thereinafter designated gas feed) then will be described.

Liquid feed flows through inlet 2 at a temperature and pressure suitable for the reaction onto horizontal partition 6. When the level of the liquid feed rises above the upper edge of section 73 of vertical partition 54 the liquid feed overflows onto liquid feed distribution plate 7. When the level of liquid feed on liquid feed distribution plate 7 rises above the upper edges of tubes 8 the liquid feed flows downwardly through tubes 8 onto conversion zone A catalyst bed 15. In starting up sufficient liquid feed is introduced into reactor 1 that a portion flows onto each of the horizontal partitions 11 and 25 to form a liquid seal for inlets 12 and 53.

In the event that more liquid feed flows onto liquid feed distribution plate 7 than can flow downwardly through tubes 8 the excess if any accumulates until the liquid feed level on plate 7 rises above the upper edge of section 40 of vertical partition 57. This excess liquid feed then flows over the upper edge of section 40 of partition 57 into downcomer or channel 10 and downwardly through channel 10 onto horizontal plate 11. This liquid feed is said to have by-passed zone A and is designated zone A by-passed liquid. Sufficient zone A by-passed liquid is accumulated on horizontal partition 11 to seal by-passed liquid inlet 12 of zone B to the flow of gas feed from zone A gas inlet chamber 13. For this purpose a small orifice or a suitable slot (not shown) is provided in the upper section 40 of plate 57 at a level just above plate 7 to ensure that a small amount of liquid flows onto plate 11 for sealing passage 12 regardless of whether liquid material flows over the upper edge of section 40 plate 57 or not. Similar provision for sealing passage 53 is made by providing an orifice or slot in section 23 of plate 54 at a level just above plate 19.

Liquid feed flowing downwardly through tubes 8 into gas disengaging chamber 14 flows downwardly therethrough onto catalyst bed 15. Gas from disengaging chamber 14 can flow in part up through tubes 8 to gas outlet chamber 47. Liquid feed flows, or percolates, or trickles downwardly through catalyst bed 15 onto gas feed distribution plate 16. Liquid feed accumulates on plate 16 until the level of the liquid feed on plate 16 rises above the level of downpipes 17. (It is to be noted that in all conversion zones but the first the liquid feed inlet plates, e.g. 19 and 30, can be eliminated or omitted especially when by-passed zone liquid is small in quantity since the catalyst bed plate provides for suitable mixing under these conditions.)

The liquid feed flowing downwardly through downpipes 17 flows downwardly through gas inlet chamber 13 onto liquid-feed distribution plate 19. Zone A by-passed liquid (if any) flowing from horizontal partition 11 through by-passed liquid inlet 12 also flows onto plate 19. The liquid feed on plate 19 accumulates until the level of the liquid feed on plate 19 rises above the level of the upper edges of tubes 20 and then flows downwardly through tubes 20 into and through gas disengaging chamber 21 onto catalyst bed 22. Gas from disengaging chamber 21 can flow in part upwardly through tubes 20 to gas inlet chamber 13.

Liquid feed accumulating on plate 19, if any, in excess of that flowing off plate 19 through tubes 20 rises to the level of the upper edge of section 23 of vertical partition 54, then overflows the upper edge of section 23 of vertical partition 54 into channel or downcomer 24. This excess flows downwardly through downcomer or channel 24 to horizontal partition 25. This excess is designated zone B by-passed liquid feed.

The liquid feed flowing onto catalyst bed 22 from gas disengaging chamber 21 flows, or percolates, or trickles downwardly through catalyst bed 22 to gas feed distribution plate 26. Liquid feed accumulates on plate 26 until the level of the liquid feed on plate 26 rises above the upper edges of downpipes 27 and then flows downwardly through downpipes 27 into gas feed inlet chamber 28.

The liquid feed flows downwardly through gas feed inlet chamber 28 onto liquid feed distribution plate 30. When the liquid feed accumulates on plate 30 in sufficient amount that level of the liquid on plate 30 rises above the level of the upper edges of tubes 31 the liquid feed flows downwardly through tubes 31 into gas disengaging chamber 32 to the top of catalyst bed 33. Gas from disengaging chamber 32 can flow in part upwardly through tubes 31 to gas inlet chamber 28.

When liquid feed accumulates on plate 30 in excess of the amount which can flow off plate 30 through tubes 31 the excess, if any, accumulates until the level of the liquid feed on plate 30 rises above the level of the upper edge of weir section 41 of vertical partion 57. The excess liquid feed flows over weir section 41 into downcomer or channel 34 down through which it flows to product pool 35 in chamber 36.

The liquid feed on the top of catalyst bed 33 flows, or percolates, or trickles downwardly through catalyst bed 33 to gas feed distribution plate 37. The treated liquid feed accumulates on plate 37 until the level of the treated liquid feed rises above the level of the upper edges of downpipes 38 and then flows downwardly through downpipes 38 into chamber 36 to form liquid pool 35. Liquid product flows from liquid pool 35 in chamber 36 through liquid product outlet 5 to fractionation and other finishing treatments.

It will be recognized by those skilled in the art that under optimum operating conditions there is no significant flow of liquid feed over weir sections 40, 23 and 41 except that required to effectively seal passages 12 and 53 and flowing through the aforementioned slots or orifices in weir sections 40, 23 and 41.

The flow of gaseous reactant through reactor 1 when liquid feed is flowing therethrough will be described now. Gaseous reactant at a temperature and pressure suitable for the reaction flows from a source (not shown) through gas feed inlet 4 to chamber 36 and thence upwardly through risers 39 into catalyst bed 33. Downpipes 38 are sealed by liquid on plate 37 and gas does not normally flow therethrough. Thus, preferred operating conditions include introducing an amount of liquid into the first conversion zone such that downpipes 17, 27 and 38 are sealed against vapor flow.

The gas feed rises upwardly through catalyst bed 33 contacting the particles of catalytic material and the partially treated liquid feed flowing downwardly through bed 33. The gas feed flows from the top of catalyst bed 33 into gas disengaging chamber 32 where the gas feed separates from entrained liquid feed. A substantial portion of the separated gas flows from disengaging chamber 32 upwardly through disengaging chamber outlet 42 to the inlet 43 to gas feed inlet chamber 28. Depending upon the amount of liquid flow introduced through liquid feed inlet 2 an appreciable amount of gas can flow from gas disengaging chamber 32 to gas feed inlet chamber 28 through tubes 31 countercurrent to the descending liquid to be treated. From gas feed chamber 28 the gaseous reactant flows upwardly through risers 29 into catalyst bed 22. The gaseous reactant flows upwardly through catalyst bed 22 countercurrent to and in contact with the partially treated liquid feed and in contact with the particles of catalytic material.

The gaseous reactant flows from the top of catalyst bed 22 into gas disengaging chamber 21 where the gaseous reactant is separated from entrained liquid feed. From gas disengaging chamber 21 a substantial portion of the gaseous reactant flows upwardly through gas disengaging chamber outlet 44 to gas feed chamber inlet 45 and thence into gas feed chamber 13. Depending upon the amount of liquid flow introduced through feed inlet 2 an appreciable amount of gas can flow from gas disengaging chamber 21 to gas feed inlet chamber 13 through tubes 20 countercurrent to the descending liquid to be treated. From gas feed chamber 13 the gaseous reactant flows upwardly through risers 18 into catalyst bed 15. In the catalyst bed 15 the gaseous reactant flows upwardly countercurrent to downwardly flowing liquid feed and in contact with the liquid feed and the particles of catalytic material. From the top of catalyst bed 15 the gaseous reactant flows upwardly into gas disengaging chamber 14 where gaseous reactant is separated from entrained liquid feed. A substantial portion of the separated gaseous reactant flows from disengaging chamber 14 upwardly through gas disengaging chamber outlet 46 to gas outlet chamber 47 (or alternatively through tubes 8 countercurrent to the descending liquid to be treated) and thence through gas feed outlet 3 to treatment for removal of desirable or undesirable components and recycling to reactor 1 or venting or for use in other processes requiring gas of the character of the gas feed flowing from outlet 3. Depending upon the amount of liquid flow introduced through liquid feed inlet 2 an appreciable amount of gas can flow from gas disengaging chamber 14 to gas outlet chamber 47 through tubes 8 countercurrent to the descending liquid to be treated.

For example, when hydrodesulfurizing kerosine, the gases issuing from outlet 3 contain hydrocarbons which can be extracted and/or recovered and the remaining hydrogen-containing gas recycled to the reactor. When hydrocracking a topped crude, gasoline and lighter hydrocarbons would be recovered from the gases issuing from outlet 3 and the hydrogen-containing gases returned to the reactor.

It will be observed that the primary flow of liquid feed and gaseous reactant is countercurrent. It will also be observed that the secondary flow, i.e., through each conversion zone, is also countercurrent.

Frequently, it is necessary to control the reaction temperature. Thus, in an exothermic reaction the reaction can be so vigorous as to lead to undesirable results. Similarly, in an endothermic reaction the absorption of heat can be so vigorous as to lower the temperature of the reactant below the optimum reaction temperature. Accordingly, provision is made to withdraw a portion of the liquid feed which has by-passed a conversion zone, to heat exchange the by-passed liquid feed to raise or to lower the temperature to a temperature suitable for the reaction and to return the heat exchanged by-passed liquid feed to a point upstream of the point from which the by-passed liquid was withdrawn for the purpose of controlling the temperature of the liquid introduced into said conversion zone or of any conversion zone downstream or upstream thereof. Thus, in Figure 1 liquid feed which has by-passed reaction zone "B" and flowed onto horizontal partition 25 flows through conduit 48 to the suction side of pump 49. Pump 49 discharges into pipe 50 through which the zone "B" by-passed liquid feed flows to heat exchanger 51. In heat exchanger 51 the zone "B" by-passed liquid feed is cooled or heated to a temperature such that when returned to reaction or conversion zone "B" or to a conversion zone upstream, and under certain conditions, downstream thereof the temperature of the reactants is regulated to the temperature required for the reaction. Thus, the heat-exchanged zone "B" by-passed liquid feed flows from heat exchanger 51 through conduit 52 onto horizontal plate 11 of conversion zone "A" which is just up-stream of conversion zone "B" with respect to the direction of flow of the liquid feed. The heat-exchanged zone "B" by-passed liquid feed can be introduced into the upstream conversion zone at any suitable point. However, for mechanical reasons it is presently preferred to introduce the heat exchanged zone "B" by-passed liquid feed into the lower part of the upstream conversion zone onto the horizontal partition (such as 11) upon which the liquid feed by-passing said upstream conversion zone accumulates. In other words, the heat-exchanged by-passed liquid feed is introduced into any conversion zone upstream with respect to the direction of flow of the liquid feed of the by-passed zone, in which the temperature requires regulation. Alternatively, the heat exchanged liquid feed can, under certain conditions well understood by those skilled in the art, be introduced downstream of the by-passed zone.

Illustrative of the process of the present invention is the hydrodesulfurization of a domestic heating oil, the operating conditions for which are presented in the following tabulation:

Table I

| | |
|---|---|
| Catalyst | A mixture of cobalt and molybdenum oxides on alumina. |
| Space velocity | 1.0 to 10.0 v./v./hr. |
| Liquid feed | Domestic heating oil, B.R. 400° F. to 675° F. |
| Gaseous reactant | Hydrogen-containing gas containing at least 50 mol percent hydrogen. |
| Gas feed liquid feed | 500 to 5000 s.c.f./b. |
| Temperature | 650° to 800° F. |
| Pressure | 200 to 1000 p.s.i. |

Additionally illustrative of the process of the present invention is the hydrogenation of distillate lubricating oil. The operating conditions for which are presented in Table II.

Table II

| | |
|---|---|
| Catalyst | Molybdenum oxide and alumina. |
| Liquid feed | Distillate lubricating oil, I.B.P., 550° F.; E.B.P., 860° F. |
| Gaseous reactant | Hydrogen-containing gas containing at least about 50 mol percent hydrogen. |
| Gas feed/liquid feed | 750 to 7500 s.c.f./b. |
| Space velocity | v./v./hr., 0.75 to 7.5. |
| Temperature | 650° to 800° F. |
| Pressure | 200 to 2000 p.s.i. |

A further illustration of the process of the present invention is the hydrocracking of a topped crude, the operating conditions for which are presented in Table III.

Table III

| | |
|---|---|
| Catalyst | Mixture of oxides of cobalt and molybdenum on alumina. |
| Liquid feed | Topped crude, B.R. 100° F. to asphalt. |
| Gaseous reactant | Hydrogen-containing gas containing at least about 50 mol percent hydrogen. |
| Gas feed/liquid feed | 2000 to 20,000 s.c.f./b. |
| Space velocity | v./v./hr., 0.5 to 5.0. |
| Temperature | 700° to 950° F. |
| Pressure | 1000 to 5000 p.s.i. |

A preferred form of reactor for use in the process of the present invention is illustrated in a highly diagrammatic manner in Figures 1, 2 and 3.

In Figure 1 a vertical section of a reactor having three conversion zones is presented. Those skilled in the art will understand that more than three or less than three conversion zones can be used and that only three are indicated in the drawings for reasons of clarity and simplicity.

The reactor comprises a cylindrical shell 1 having a top and a bottom. The reactor is insulated in any suitable manner. The shell is of such thickness and material to withstand pressures up to about 2500 p.s.i.g. The reactor is provided with a gas outlet in the top thereof and a liquid products outlet in the bottom thereof. The reactor is divided into a plurality of conversion zones "A," "B" and "C" as illustrated. Each conversion zone comprises a liquid-feed distributing means constructed and arranged to distribute the liquid feed over the cross section of a catalyst bed disposed beneath and concentric therewith, a gas disengaging chamber intermediate said liquid-feed distributing means and said catalyst bed, a gas-feed distributing means beneath and supporting said catalyst bed, said gas-feed distributing means being constructed and arranged to deliver gas feed over the cross-section of said catalyst bed and to drain liquid feed from the bottom of said catalyst bed into a gas-feed inlet chamber, a gas-feed inlet chamber beneath said gas-feed distributing means, means connecting said gas disengaging chamber of each conversion zone with said gas inlet chamber of the next conversion zone upstream with respect to the direction of flow of said liquid feed to transfer gas feed from each conversion zone to said upstream conversion zone, means constructed and arranged for accumulating liquid feed by-passing said conversion zone and discharging said by-passed liquid feed into the next conversion zone downstream with respect to the direction of flow of said liquid feed, a gas outlet chamber above the first conversion zone with respect to the direction of flow of said liquid feed, means connecting said gas disengaging chamber of said first conversion zone with said gas outlet chamber constructed and arranged for transferring gases from said gas-disengaging chamber of said first conversion to said gas outlet chamber, a liquid product chamber located below the gas-feed inlet chamber of the last conversion zone with respect to the direction of flow of said liquid feed constructed and arranged to provide a liquid seal for said liquid products outlet, and means constructed and arranged for transferring liquid feed by-passing said last conversion zone to said liquid products chamber. The reactor is provided with a liquid-feed inlet disposed to deliver liquid feed onto the liquid-feed distributing means of said first conversion zone and a gas feed inlet disposed to deliver gas feed to the gas inlet chamber in the aforesaid last conversion zone.

Thus, referring to Figures 1, 2 and 3 the reactor comprises a shell 1, liquid feed inlet 2, gas outlet 3, and gas feed inlet 4. Mounted vertically between the vertical axis of reactor 1 and liquid feed inlet 2 is a first vertical partition 54. Vertical edges 55 and 56 (Figure 3) are rigidly secured in a gas-and-liquid-tight manner, as by welding, to the inner periphery of shell 1. A second vertical partition 57 is disposed vertically between the vertical axis of the reactor and the shell parallel to first vertical partition 54 and spaced from shell 1 a distance greater than the diameter of gas disengaging outlet 46 to permit flow of by-passed liquid feed down partition 57 to horizontal partition 11. Second vertical partition 57 is rigidly mounted on the inner periphery of shell 1 in any suitable gas-and-liquid-tight manner as by welding along the vertical edges 58 and 59 (Figure 3). Second vertical partition 57 is mounted with the upper edge somewhat below the level of the upper edge of first vertical partition 54. The lower horizontal edge 60 of second vertical partition 57 is below the level of gas feed inlet 4 and spaced from the bottom of the reactor. The lower edge 61 of first vertical partition 54 is at least co-planar with gas feed inlet 4. The lower portion of second vertical partition 57 extends into the pool of liquid 35 in the bottom of the reactor and forms a liquid seal which prevents gas feed from by-passing the lowermost reaction zone. Treated liquid product is drawn from pool 35 through product outlet 5.

Below the liquid feed inlet and between first vertical partition 54 and shell 1 horizontal partition 6 is mounted horizontally in any suitable gas-and-liquid-tight manner. Horizontal partition 6 can be supported in a suitable manner as by brackets 62 and 63.

A liquid-feed distributing means is mounted horizontally in any suitable gas-and-liquid-tight manner between vertical partitions 54 and 57 and shell 1 a distance below the upper edge of vertical partition 57 greater than the height of tubes 8 above plate 7 to provide a means for maintaining a pool of liquid feed on plate 7 somewhat deeper than the distance between plate 7 and the level of the upper edges of tubes 8. Preferably, plate 7 and horizontal partition 6 are coplanar. Plate 7 can be supported in any suitable manner as by angles 64 and 65.

At a point sufficiently greater than the depth of the catalyst bed to be supported thereon to provide a gas disengaging chamber between the top of said catalyst bed and the bottom edges of tubes 8 a gas-feed distributing means of any suitable type such as plate 16, with downpipes 17 and risers 18 is mounted horizontally in any suitable gas-and-liquid-tight manner as by welding, between partitions 54 and 57 and shell 1. Plate 16 can be supported in any suitable manner as by brackets 66.

Downpipes 17 and risers 18 are of any suitable type for draining liquid feed from and admitting gas feed to the bottom of catalyst bed 15 without permitting any significant amount of catalyst to pass. For example, the gas-feed distributing means can be similar to a common bubble-cap tray. As illustrated, risers 18 comprise tubes 68 having the lower edge thereof substantially coplanar with the level of plate 16 and surmounted by caps 69 mounted in any suitable manner to permit flow of gas up through tubes 68, and into catalyst bed 15 while preventing the flow of catalyst particles into tubes 68. Downpipes 17 are similarly disposed but do not extend upwards as far as risers 18 and are so designed as to permit flow of liquid down through downpipes 17 while preventing significant flow of catalyst into tubes 67.

At the level of the gas disengaging chamber in alternate conversion zones beginning with the first conversion zone with respect to the direction of flow of the liquid feed, second vertical partition 57 is provided with passages each connecting the gas disengaging chamber of each of said alternate conversion zones with the conduit formed between shell 1 and second vertical partition 57. Preferably, said passages are L-shaped conduits having the upper edge of the vertical leg thereof substantially coplanar with the inlet to the gas inlet chamber of the next conversion zone up-stream with respect to the direction of flow of said liquid feed. Thus, second vertical partition 57 is provided with passages 46, providing for flow of gas from chamber 14 to gas outlet 47, and 42, providing for flow of gas from chamber 32 to chamber 28.

At the level of the gas disengaging chamber in alternate conversion zones beginning with the second conversion zone with respect to the direction of flow of the liquid feed, first vertical partition 54 is provided with passages each connecting the gas disengaging chamber in each of said alternate conversion zones with the conduit formed between first vertical partition 54 and shell 1. Thus, first vertical partition 54 is provided with passage 44. Preferably, said passages are L-shaped conduits having the upper edge of the vertical leg thereof substantially coplanar with the inlet to the gas inlet chamber of the next conversion zone upstream with respect to the direction of flow of said liquid feed. Passages such as 44 provide for flow of gas in addition to that which flows upwardly through tubes 20.

At the level of the gas inlet chamber in alternate conversion zones beginning with the first but excluding the last conversion zone with respect to the direction of flow of the liquid feed, first vertical partition 54 is provided with a passage for flow of gas feed from the conduit formed between shell 1 and first vertical partition 54 into the gas feed inlet chamber of each of said alternate conversion zones. Thus, first vertical partition 54 is provided with passage 45 permitting flow of gas feed from gas disengaging chamber 21 through passage 44 into conduit 70 and thence through passage 45 into gas feed inlet chamber 13.

Similarly, second vertical partition 57 is provided with passages each at the level of the gas feed inlet chamber in alternate conversion zones beginning with the second conversion zone with respect to the direction of flow of the liquid feed for flow of gas feed from the conduit formed between second vertical partition 57 and shell 1. Thus, second vertical partition 57 is provided with passage 43 permitting flow of gas feed from gas disengaging chamber 32 through passage 42 into conduit 34 and thence through passage 43 into gas feed inlet chamber 28. This gas flow is in addition to that occurring through tubes 31.

In the conduit formed between shell 1 and first vertical partition 54 and in the conduit formed between shell 1 and second vertical partition 57 at a point above the level of the upper edges of the downcomer tubes (20 and 31) in the liquid feed distributing means in each conversion zone except the first conversion zone with respect to the direction of flow of the liquid feed a by-passed liquid-feed accumulator partition is mounted horizontally in any suitable gas-and-liquid-tight manner for maintaining a pool of by-passed liquid-feed on each of said by-passed liquid feed accumulator horizontal partitions (11 and 25).

Above the level of said by-passed liquid feed accumulator partitions first vertical partition 54 and second vertical partition 57 are provided with by-passed liquid-feed inlets (12 and 53) connecting the conduits formed between first vertical partition 54 and shell 1 and between second vertical partition 57 and shell 1 with the gas feed inlet chamber of each conversion zone.

Attached to the vertical partitions 54 and 57 above each of the aforesaid by-passed liquid-feed inlets and dipping into the pool of by-passed liquid feed on the contiguous accumulator partition are seal plates (such as 71 and 72) forming with the vertical partitions 54 and 57 gas seals for said by-passed liquid feed inlets prohibiting the flow of gas feed through said by-passed liquid feed inlets.

Thus, conversion zone "A" is provided with accumulator partition 11, seal plate 71 and by-passed liquid-feed inlet 12 and conversion zone "B" is provided with accumulator partition 25, seal plate 72, and by-passed liquid-feed inlet 53.

It will be understood by those skilled in the art that each of the vertical partitions can be fabricated from a plurality of plates rather than from a single plate as described hereinbefore. It will also be understood that the reactor is provided with one or more means for introducing catalyst into and removing catalyst from the conversion zones. The reactor is also provided with one or more man-ways to facilitate inspection and repair of the interior.

Accordingly, the present invention provides a reactor for countercurrent flow of liquid feed and gaseous feed wherein the liquid reactant flows downwardly successively through a plurality of conversion zones while the gas feed flows upwardly successively through said plurality of conversion zones. Said reactor comprising a cylinder having a top and a bottom, a first vertical partition rigidly mounted in a gas-and-liquid-tight manner vertically between the vertical axis of said cylinder and a first sector of said cylinder less than 180°, having the upper and lower horizontal edges thereof vertically spaced respectively from said cylinder top and said cylinder bottom and forming between the shell side of said first vertical partition and said first sector of said cylinder a first sector conduit, a second vertical partition rigidly mounted vertically in a gas-and-liquid-tight manner parallel and horizontally disposed from said first vertical partition between said vertical axis and a second sector of said cylinder less than 180°, having the upper horizontal edge thereof below the level of the upper horizontal edge of said first vertical partition, having the lower horizontal edge thereof below the level of the lower horizontal edge of said first vertical partition and vertically spaced from said cylinder bottom, the shell side of said second vertical partition and said second cylinder sector forming a second sector conduit, said first and second vertical partitions together with the third and fourth cylinder sectors joining the axis sides of said first and second vertical partitions forming a hollow column, a liquid feed inlet in said cylinder in the region of the top thereof communicating with said first sector conduit at a point below the upper horizontal edge of said first vertical partition, a gas feed inlet in said cylinder in the region of the bottom thereof communicating with said first sector conduit at a point about co-planar with the lower horizontal edge of said first vertical partition, a gas outlet in the top of said cylinder, a liquid-product outlet in the bottom of said cylinder, means for forming a pool of liquid product in the bottom of said cylinder extending above the level of the lower horizontal edge of said second vertical partition to form a liquid seal at the bottom of said second sector conduit and below the level of the lower horizontal edge of said first vertical partition, a first horizontal partition rigidly mounted horizontally in a gas-and-liquid-tight manner in said first sector conduit below said liquid-feed inlet, a plurality of conversion zones vertically spaced in said hollow column, each of said conversion zones comprising a liquid-feed distributing means rigidly mounted horizontally in a gas-and-liquid-tight manner in said hollow column, a catalyst bed support plate rigidly mounted horizontally in a gas-and-liquid-tight manner in said hollow column below said liquid-feed distributing means to provide space therebetween for a bed of particle-form catalytic material and a gas disengaging chamber, a catalyst bed zone extending upwardly from said catalyst bed support plate, a gas-disengaging chamber between the top of said catalyst bed zone and said liquid-feed distributing means, a gas-feed-inlet chamber directly beneath said catalyst bed support plate in gas and liquid communication with said catalyst bed of said conversion zone and the next succeeding conversion zone in the direction of flow of said liquid feed, said liquid-feed distributing means being constructed and arranged to maintain a pool of liquid feed thereon and to flow liquid feed into said gas-disengaging chamber and over the cross-section of said catalyst bed zone, said catalyst bed support plate being constructed and arranged to support a bed of particle-form solid catalytic material, to distribute gas feed over the cross-section of said catalyst bed zone, and to drain treated liquid feed into said gas-feed-inlet chamber without substantial entrainment of catalyst particles, in each of said conversion zones, except the last conversion zone in the direction of flow of said liquid feed, a by-passed-liquid-feed accumulator plate horizontally mounted in a rigid, gas-and-liquid-tight manner alternately in said first and second sector conduit at a level above the level of the liquid-feed distributing means of the next conversion zone, beginning with the first conversion zone in the direction of flow of said liquid-feed and with said second sector conduit a by-passed-liquid-feed inlet in said gas-feed inlet chamber constructed and arranged to flow by-passed-liquid-feed from said accumulator plates through said gas-feed inlet chamber onto the liquid-feed distributing means of the next conversion zone in the direction of flow of said liquid-feed, a baffle plate attached to the shell side of said vertical partitions above said by-passed-liquid-feed inlet forming with accumulated by-passed-liquid-feed a gas seal substantially preventing flow of gas-feed from said gas-feed inlet chamber into the sector conduit above said accumulator plate, a gas-feed inlet in said gas-feed inlet chamber communicating with the other sector conduit respective to the sector conduit in which said accumulator plate is mounted constructed and arranged for flow of gas-feed from the gas-separating zone of the next conversion zone in the direction of flow of said liquid feed, a gas-feed outlet in said gas-separating chamber communicating with the sector conduit in which said accumulator plate is mounted, and a liquid-feed outlet above said liquid-feed distributing means constructed and arranged for flow of liquid feed from said pool of liquid feed on said liquid-feed distributing means in excess of that flowing downwardly through said liquid-feed distributing means into the sector conduit in which said by-passed-liquid-feed accumulator plate is mounted.

I claim:

1. An apparatus for the conversion of liquid hydrocarbons in the presence of both particle-form solid catalytic material and gaseous reactant which comprises a cylindrical shell having a top and a bottom, a gas outlet in the top thereof, a liquid products outlet in the bottom thereof, a plurality of vertically disposed hydrocarbon conversion zones in serial countercurrent liquid-gas communication, each of said conversion zones comprising a liquid-feed distributing means, a catalyst bed disposed beneath and concentric with said liquid-feed distributing means, said liquid-feed distributing means being constructed and arranged to distribute liquid feed over the cross-section of and in contact with said catalyst bed, a gas-disengaging chamber intermediate said liquid-feed distributing means and said catalyst bed, a gas-feed distributing means beneath and supporting said catalyst bed, said gas-distributing means being constructed and arranged to deliver gas feed over the cross-section of and in contact with said catalyst bed and to drain liquid feed from the bottom of said catalyst bed into and through a gas-feed inlet chamber, a gas-feed inlet chamber beneath said gas-feed distributing means, means connecting said gas disengaging chamber of each conversion zone with said gas inlet chamber of the next conversion zone upstream with respect to the direction of flow of said liquid feed to transfer gas feed from each conversion zone to said next upstream conversion zone, means constructed and arranged for accumulating liquid feed by-passing said conversion zone and means for discharging by-passed liquid feed into the next conversion zone downstream with respect to the direction of flow of said liquid feed, a gas outlet chamber above the first conversion zone with respect to the direction of flow of said liquid feed, means connecting said gas-disengaging chamber of said first conversion zone with said gas outlet chamber constructed and arranged for transferring gases from said gas-disengaging chamber of said first conversion chamber to said gas outlet chamber, a liquid product chamber located below the gas-feed inlet chamber of the last conversion zone with respect to the direction of flow of said liquid feed constructed and arranged to provide a liquid seal for said liquid products outlet, and means constructed and arranged for transferring liquid feed by-passing said last conversion zone to said liquid products chamber.

2. In the apparatus for the conversion of liquid hydrocarbons in the presence of both particle-form solid catalytic material and gaseous reactant as set forth and described in claim 1, means for withdrawing liquid feed from one conversion zone, heat exchanging said withdrawn liquid-feed, and returning said heat exchanged liquid-feed to a locus upstream in the direction of flow of said liquid feed of said conversion zone from which said liquid feed was withdrawn.

3. An apparatus for the conversion of hydrocarbons in the presence of particle-form solid catalytic material and gaseous reactant which comprises a cylindrical shell having a top and a bottom, a first vertical partition rigidly mounted in a gas-and-liquid-tight manner vertically between the vertical axis of said cylindrical shell and a first sector of said cylindrical shell less than 180°, having the upper and lower horizontal edges thereof vertically spaced respectively from said shell top and bottom and forming between the shell side of said first vertical partition and said first sector of said shell a first sector conduit, a second vertical partition rigidly mounted vertically in a gas-and-liquid-tight manner horizontally disposed from said first vertical partition between said vertical axis of said shell and a second sector of said shell less than 180°, said second vertical partition having the upper horizontal edge thereof below the level of the upper horizontal edge of said first vertical partition and having the lower horizontal edge thereof below the level of the lower horizontal edge of said first vertical partition and vertically spaced from said shell bottom, the shell side of said second vertical partition and said second shell sector forming a second sector conduit, said first and second vertical partitions and the third and fourth shell sections joining the axis sides of said first and second vertical partitions forming a hollow column, a liquid feed inlet in said shell in the region of the top thereof communicating with said first sector conduit at a point below the upper horizontal edge of said first vertical partition, a gas feed inlet in said shell in the region of the bottom thereof communicating with said first sector conduit at a point not below the lower horizontal edge of said first vertical partition, a gas outlet in the top of said shell, a liquid-product outlet in the bottom of said shell, means for forming a pool of liquid product in the bottom of said shell extending above the level of the lower horizontal edge of said second vertical partition to form a liquid seal at the bottom of said second sector conduit and below the level of the lower horizontal edge of said first vertical partition, a first horizontal partition rigidly mounted horizontally in a gas-and-liquid-tight manner in said first sector conduit below said liquid-feed inlet, a plurality of conversion zones vertically spaced in said hollow column, each of said conversion zones comprising a liquid-feed distributing means rigidly mounted horizontally in a gas-and-liquid-tight manner in said hollow column, a catalyst bed support plate rigidly mounted horizontally in a gas-and-liquid-tight manner in said hollow column below said liquid-feed distributing means to provide space therebetween for a bed of particle-form solid catalytic material and a gas-disengaging chamber, a catalyst bed zone extending upwardly from said catalyst bed support plate, a gas-disengaging chamber between said catalyst bed zone and said liquid-feed distributing means, a gas-feed inlet chamber directly beneath said catalyst bed support plate in gas and liquid communication with said catalyst bed of said conversion zone and the next succeeding conversion zone in the direction of flow of said liquid feed, said liquid-feed distributing means being constructed and arranged to maintain a pool of liquid feed thereon and to flow liquid feed into said gas-disengaging chamber and over the cross-section of said catalyst bed zone, and simultaneously allowing at least a portion of the gas from the zone below to flow upwardly therethrough, said catalyst bed support plate being constructed and arranged to support a bed of particle-form solid catalytic material, to distribute gas feed over the cross-section of said catalyst zone, and to drain treated liquid feed into said gas-feed-inlet chamber without substantial entrainment of catalyst particles, in each of said conversion zones, except the last conversion zone in the direction of flow of said liquid feed, a by-passed-liquid-feed accumulator plate horizontally mounted in a rigid, gas-and-liquid-tight manner alternately in said first and second sector conduits at a level above the level of the liquid-feed distributing means of the next conversion zone beginning with the first conversion zone in the direction of flow of said liquid feed and with said second sector conduit, a by-passed-liquid-feed inlet in said gas-feed-inlet chamber constructed and arranged to flow by-passed liquid feed from said accumulator plates to said gas-feed-inlet chamber and onto the liquid-feed distributing means of the next conversion zone in the direction of flow of said liquid feed, a baffle plate attached to the shell side of said vertical partitions above said by-passed-feed inlet forming with accumulated by-passed-liquid feed a gas seal substantially preventing flow of gas feed from said gas-feed-inlet chamber into the sector conduit above said accumulator plate, a gas-feed inlet in said gas-feed-inlet chamber communicating with the other sector conduit respective to the sector conduit in which said accumulator plate is mounted, constructed and arranged for flow of at least a portion of gas feed from the gas separating chamber of the next conversion zone in the direction of flow of said liquid feed, a gas feed outlet in said gas-separating chamber communicating with the sector conduit in which said accumulator plate is mounted, and a liquid-feed outlet above said liquid-feed distributing means constructed and arranged for flow of liquid feed in excess of that flowing downwardly through said liquid-feed distributing means from a pool of liquid feed on said liquid-feed distributing means into the sector conduit in which said by-passed-liquid-feed accumulator plate is mounted.

4. In the apparatus for the conversion of hydrocarbons in the presence of particle-form solid catalytic material and gaseous reactant as set forth and described in claim 3, means for withdrawing by-passed-liquid-feed from the accumulator plate of a conversion zone, heat exchanging said withdrawn by-passed-liquid-feed, and returning said heat exchanged liquid-feed to a conversion zone upstream in the direction of flow of said liquid-feed of said conversion zone from which said liquid-feed was withdrawn.

5. A method of hydrocarbon conversion which comprises establishing a plurality of conversion zones at reaction temperature and pressure each containing a static bed of particle-form solid catalyst, introducing predominantly liquid hdrocarbon at reaction temperature and pressure into the first of said conversion zones, flowing said predominantly liquid hydrocarbon successively from said first conversion zone through each intermediate conversion zone and through said last conversion zone in contact with said catalyst in each of said zones, introducing gaseous reactant at reaction pressure and at least reaction temperature into the last of said conversion zones, flowing gaseous reactant successively from said last conversion zone through each intermediate conversion zone and through said first conversion zone in contact with said catalyst in each of said zones, in each of said conversion zones the liquid hydrocarbon being introduced at one side of said static bed of catalyst and the gaseous reactant being introduced at the opposing side of said static bed of catalyst, whereby the flow of liquid hydrocarbon and gaseous reactant is countercurrent in each of said conversion zones, withdrawing gaseous reactant from said first zone, and withdrawing treated liquid hydrocarbon from said last zone.

6. In the method of hydrocarbon conversion set forth and described in claim 5 withdrawing a portion of the liquid hydrocarbon from a conversion zone, heat exchanging said withdrawn liquid hydrocarbon, and returning said heat exchanged hydrocarbon to a conversion zone upstream in the direction of flow of said liquid hydrocarbon of the conversion from which said heat exchanged hydrocarbon was withdrawn.

References Cited in the file of this patent
UNITED STATES PATENTS

| | | |
|---|---|---|
| 2,707,163 | Thibaut | Apr. 26, 1955 |
| 2,762,683 | Massey | Sept. 11, 1956 |